United States Patent Office 3,511,919
Patented May 12, 1970

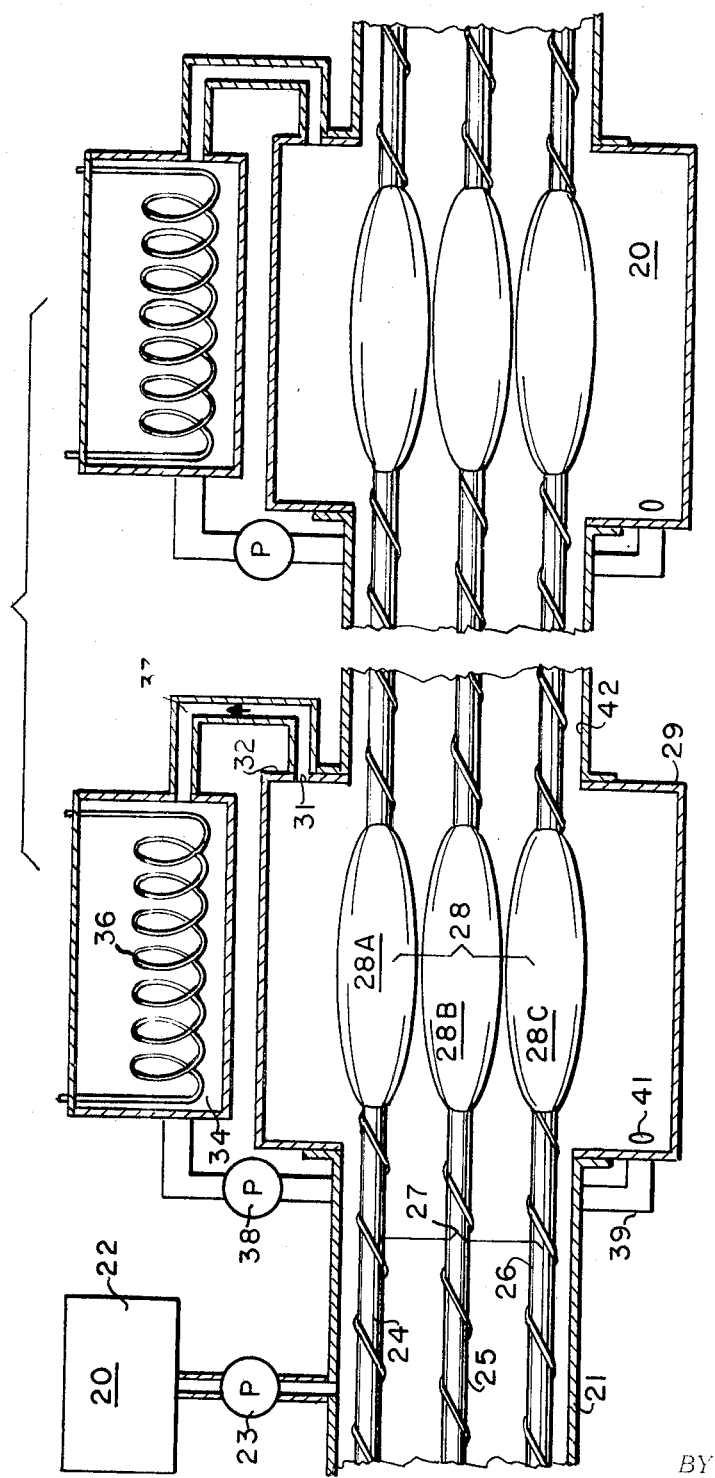
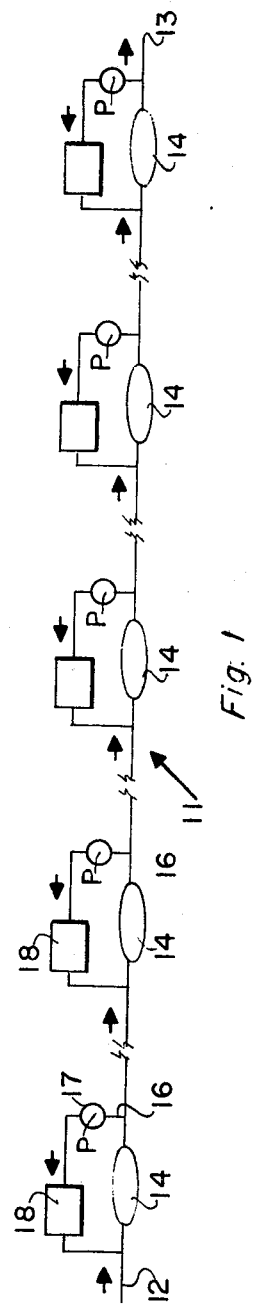
Fig. 2
Fig. 1
INVENTOR
ALAN K. MILLER
BY
HIS AGENT

3,511,919
FLUID-INSULATED POWER CABLES AND JOINTS AND METHOD OF COOLING
Alan K. Miller, Cedarhurst, N.Y., assignor to Anaconda Wire and Cable Company, a corporation of Delaware
Filed July 15, 1968, Ser. No. 744,710
Int. Cl. H01b 7/34
U.S. Cl. 174—15                                    11 Claims

ABSTRACT OF THE DISCLOSURE

Joints in a pipe-type cable are cooled by passing a portion of the dielectric fluid from a point directly downstream of the joint, through a cooling unit, back into the cable at a point directly upstream of the joint.

BACKGROUND OF THE INVENTION

This invention relates to electric power cables of the type where a portion, at least, of the electrical insulation surrounding the conductor or conductors has the form of a dielectric fluid. A form of such cable to which our invention has particular application is known as a pipe-type cable wherein the conductors, wrapped with insulating tapes to form cable cores are contained in an extended pipe along with pressurized oil or inert gas that fills any interstices or spaces in the tapes with an electrically insulating medium and also serves as a heat transfer means to carry away heat from the conductors to the pipe walls. When the length of a pipe-type cable exceeds more than a few thousand feet it must be provided with joints in the cores, since any continuous length of core is limited to the capacity of the shipping reels. The joints, however, constitute the portion of a cable that is most likely to fail, largely because the conductor splices are apt to have increased electrical resistance and because the additional electrical insulation over the joints reduces the heat transfer rate. There have been suggestions, of which Pat. 2,286,594, issued June 16, 1942 is typical, for the incorporation of cooling units periodically along the length of pipe-type cables. In the structure described by this and similar patents there is a bypass around each joint connected to a cooling unit. It is a defect of such structures, however, that any cooling of the core joints is merely an incidental benefit derived from the general cooling of the cable oil and no special provision is made to cool the cable at the joints which constitute its most vulnerable points.

SUMMARY

I have discovered that a fluid-insulated cable will benefit by having the cooling effort applied specifically to the fluid flowing into the joints so that these most vulnerable portions of the cable receive the principal cooling effect thus prolonging cable life and reducing the incidence of joint failures. My improvement applies to electric power cables of the type comprising a cable core, dielectric fluid insulating the core and a sheath containing the core and the fluid, with means urging the fluid from an upstream to downstream station within the sheath and a plurality of joints in the core between the stations. Where the cable is a pipe-type cable the sheath will comprise a rigid pipe and the fluid will be liquid or comprise a pressurized gas. My improvement comprises cooling means external to the sheath at each joint with connecting means supplying dielectric fluid from the cable such as from a point directly downstream of the joint to the cooling means, and connecting means supplying a cooled quantity of the fluid from the cooling means to the cable directly upstream of the joint.

The method of my invention for cooling fluid-insulated power cable that comprise a plurality of joints and means urging dielectric fluid from a station upstream of the joints to a station downstream of the joints comprises the steps of directing a portion of the dielectric fluid that is flowing through the cable into a cooling means and back into the cable directly upstream of the joints so as to cool the joints preferentially over the remainder of the cable.

More particularly I have invented a pipe-type cable connection comprising an insulated cable-core joint, a dielectric fluid surrounding the joint, containing means surrounding both the fluid, which may be liquid or may be a pressurized gas, and the joint, and cooling means external to the containing means. Piping means connect the cooling means to the containing means at points directly upstream and downstream of the joint and a pump urges the fluid through the cooling means and the containing means.

BRIEF DESCRIPTION OF THE DRAWING

FIG. 1 shows a diagram of the steps of the method of my invention.

FIG. 2 shows a horizontal view, partly in section, of a cable made to my invention.

DESCRIPTION OF THE PREFERRED EMBODIMENT

Referring to FIG. 1 the method of my invention becomes clear. In the figure a cable 11 extends over an extended distance including an upstream station 12 and a downstream station 13 between which there are a plurality of joints 14—14. The dielectric fluid in the cable (see FIG. 2) normally flows downstream through each of the joints 14 which may have the simple purpose of connecting two running cable lengths but may also serve as taps or include transformers or other apparatus. Directly downstream of each joint 14 a pipe connection 16 bypasses a portion of the dielectric cable fluid through a pump 17 into a cooling unit 18 whence it is payed back into the cable 11 just upstream of the joint 14.

A pipe-type cable made to my invention is shown in FIG. 2. Here a length of rigid pipe 21 can be considered as an upstream station into which dielectric fluid 20 is introduced from a reservoir 22 by means of a pump 23. The pipe 21 encloses three insulated conductors 24, 25, 26 which I shall consider to constitute a core 27 of a three conductor cable. A joint 28 in the core 27 is made up of individual conductor joints 28a, 28b, 28c and is enclosed in an enlarged section 29 of the pipe 21 into which the fluid 20 flows from the station 12 whence a portion is drawn through an outlet 31 in a downstream wall 32 of the enlarged pipe section 29 through a pipe length 33 into a cooling unit 34 where heat is withdrawn by a cooling coil 36 through which water, brine, refrigerant, or the like are circulated from a supply not shown. Many different known types of heat exchangers or other cooling apparatus are suitable for the function of the unit 34 and units that combine cooling and pressurizing or storing will also be included within the scope of my invention. The fluid 20 is a natural or synthetic hydrocarbon oil maintained at high pressure such as 200 p.s.i. by the pump 23. My improved cable has application however where it is desired to use an inert gas such as pressurized nitrogen for the fluid 20, in which case the tank 22 and pump 23 might be replaced by a gas cylinder and pressure release valve and the gas might be further compressed by a compressor, not shown, before entering the cooling unit 34. Where the fluid is gaseous the pump 38 will be replaced by a check valve and the gas pumped positively into the unit 34 by a pump in the line 33 from the outlet 31.

The fluid 20 is drawn through the cooling unit 34 by a pump 38 that urges it through a pipe 39 into an aperture 41 in the section 29. The aperture 41 is positioned immediately upstream of the joint 28 and the cooled fluid mixes with other fluid passing over the joint from the pipe 21. The enlarged section 29 feeds on its downstream side into another length 42 of pipe having the same dimensions as the pipe length 21.

If $M_1$ represents the mass of fluid per unit time entering the pipe 42 from the enlarged section 29, and $M_2$ represents the mass per unit time of fluid entering the outlet 31 leading to the cooling unit and if $T_1$ represents the temperature of the fluid entering the section 29 from the pipe 21, $T_2$ represents the temperature of the fluid leaving the pipe 39 through the aperture 41, $T_3$ represents the rise in fluid temperature due to abstraction of heat from the joints 28, and $T_4$ represents the temperature of fluid entering the pipe 42 and outlet 31 then, ignoring heat exchange through the walls of the section 29, $$T_4 = \frac{M_1}{M_1 + M_2} T_1 + \frac{M_2}{M_1 + M_2} T_2 + T_3$$

The capacity of the cooling unit 36 should be such that $T_3$ is sufficiently cooler than $T_4$ to compensate for the heat introduced into the cable in the pipe length 42.

I have invented a new and useful article and method of which the foregoing description has been exemplary rather than definitive and for which I desire an award of Letters Patent as defined in the following claims.

I claim:
1. In an electric power cable comprising a cable core, dielectric fluid insulating said core, a sheath containing said core and said fluid, means urging said fluid from an upstream to a downstream station within said sheath, and a plurality of joints in said core between said stations, the improvement comprising:
   (A) individual cooling means external to said sheath at said joints,
   (B) connecting means supplying said fluid from said cable to said cooling means, and
   (C) connecting means supplying a cooled quantity of said fluid from said cooling means to said cable immediately upstream of said joints.
2. The cable of claim 1 wherein said fluid is supplied to said cooling means from points in said pipe immediately downstream of said joints.
3. The cable of claim 1 comprising pumping means for each of said cooling means.
4. The cable of claim 1 wherein said cable is pipe-type and said sheath comprises a rigid pipe.
5. The cable of claim 1 wherein said fluid is liquid.
6. The cable of claim 1 wherein said fluid comprises a pressurized gas.
7. The method of cooling fluid-insulated power cables comprising a plurality of joints and means urging dielectric fluid from a station upstream of said joints to a station downstream of said joints comprising the steps of directing a portion of said dielectric fluid flowing through said cable into a cooling means, and introducing said portion, after cooling, into said cable directly upstream of said joints whereby said joints are cooled preferentially over the remainder of said cable.
8. The method of claim 7 wherein said fluid is directed to said cooling means from points in said cable directly downstream of said joints.
9. A pipe-type cable connection comprising:
   (A) an insulated cable-core joint,
   (B) dielectric fluid surrounding said joint,
   (C) containing means surrounding said joint and said fluid,
   (D) cooling means external to said containing means,
   (E) piping means connecting said cooling means to said containing means at points directly upstream and downstream of said joint,
   (F) pumping means urging said fluid through said cooling means and said containing means around said joint.
10. The connection of claim 9 wherein said fluid is liquid.
11. The connection of claim 9 wherein said fluid comprises a pressurized gas.

References Cited

UNITED STATES PATENTS

| | | | |
|---|---|---|---|
| 2,066,322 | 1/1937 | Bennett | 174—15 |
| 2,186,444 | 1/1940 | Bennett | 174—15 X |
| 2,306,850 | 11/1942 | Usselman | 174—15 |
| 3,363,046 | 1/1968 | Endacott | 174—15 |
| 3,429,979 | 2/1969 | Davey | 174—15 |

FOREIGN PATENTS 1,076,355  7/1967  Great Britain.

LARAMIE E. ASKIN, Primary Examiner

A. T. GRIMLEY, Assistant Examiner

U.S. Cl. X.R.

165—108; 174—16, 21